UNITED STATES PATENT OFFICE.

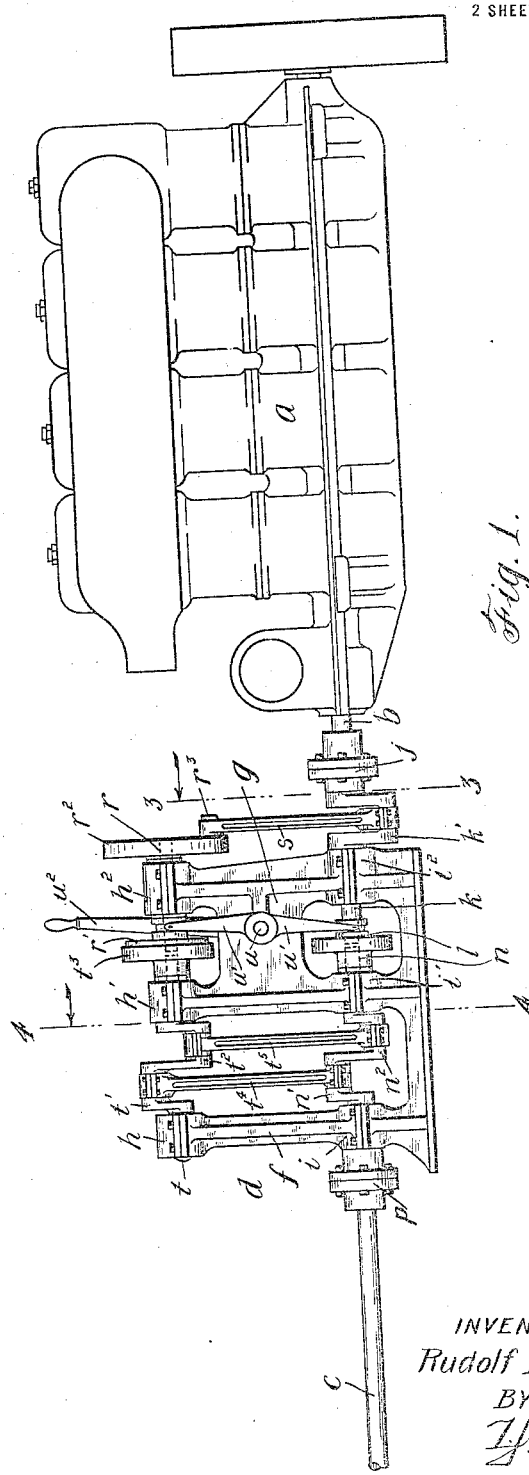

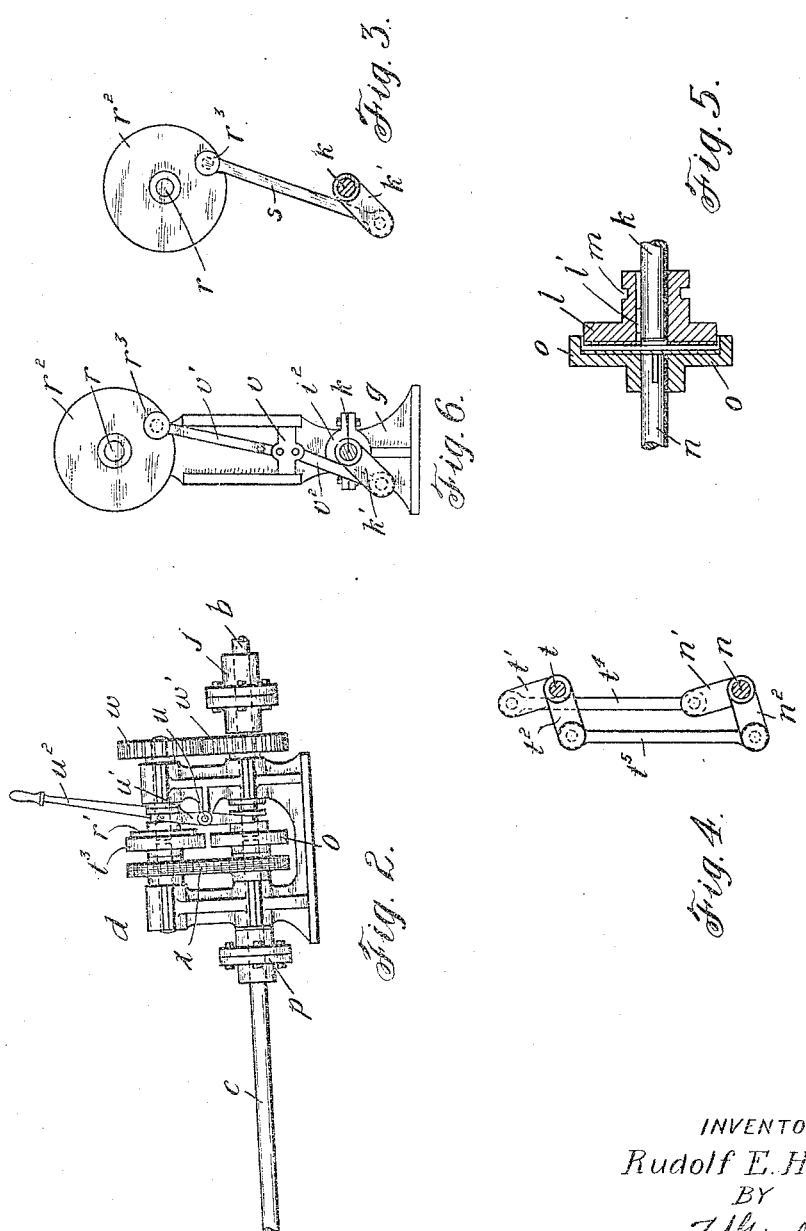

RUDOLF E. HENRICI, OF RIDGEFIELD, WASHINGTON.

REVERSING-GEAR MECHANISM.

1,195,136.    Specification of Letters Patent.    Patented Aug. 15, 1916.

Application filed November 12, 1915. Serial No. 61,168.

*To all whom it may concern:*

Be it known that I, RUDOLF E. HENRICI, a citizen of the United States, and a resident of the city of Ridgefield, county of Clark, State of Washington, have invented a new and useful Improvement in Reversing-Gear Mechanism, of which the following is a specification.

My invention relates to reversing gear mechanism used for transmitting either direct or reverse motion from a prime mover to a work shaft.

This invention is particularly adaptable for use in connection with marine engines, and one of the main objects of this invention is to provide a strong, reliable, noiseless reversing gear, the elements of which are fully exposed, so that all parts may be readily inspected and maintained in proper adjustment.

In the accompanying drawings: Figure 1 is a side elevation of a marine engine, the propeller shaft driven by said engine, and the reversing gear mechanism of my invention as used in connection therewith; Fig. 2 is a side elevation showing an alternate construction of certain elements of the reversing gear mechanism; Fig. 3 is a vertical section taken approximately on the line 3—3 of Fig. 1; Fig. 4 is a vertical section taken on the line 4—4 of Fig. 1; Fig. 5 is a longitudinal vertical section of one of the clutch members, showing the details of construction; and Fig. 6 is a view similar to Fig. 3, but showing an alternate construction.

Referring to the drawings, a marine engine of the standard type is indicated by $a$.

$b$ is the engine shaft and $c$ is a propeller shaft adapted to be driven either directly or reversely from the engine.

The reversing gear mechanism of my invention is indicated in its entirety by $d$, and such mechanism comprises a base $e$ provided with pedestals $f$ $g$, which support the two sets of journal boxes $h$ $h'$ $h^2$ and $i$ $i'$ $i^2$, the members of each set being in longitudinal alinement. A crank shaft $k$ has a bearing in the journal box $i^2$. Said crank shaft is provided with one crank $k'$ and one end of said crank is rigidly connected to the engine shaft $b$ by a shaft coupling $j$, the other end having mounted thereon a male friction clutch member $l$. The latter is longitudinally movable by a key $l'$, but by the same is held non-rotatable relative to the crank shaft $k$. The clutch member $l$ is further provided with a hub in which is a peripheral groove $m$ adapted to receive a clutch shifter element. A companion crank shaft $n$, provided with two cranks $n'$ $n^2$ located relatively at 90 degrees with respect to each other (see Fig. 4), is journaled in the bearings $i$ $i'$. One end of this crank shaft has rigidly fixed thereon a female clutch member $o$, in juxta-position with the clutch member $l$, and the other end of said shaft is bolted to the propeller shaft $c$ by the shaft coupling $p$. When the male clutch member $l$, is moved into engagement with the companion female member $o$, the shafts $k$ and $n$ will be directly connected, and the drive of the engine shaft $b$ will be transmitted in direct motion to the propeller shaft $c$.

Journaled in the bearing $h^2$ is a shaft $r$. The latter has fixed on one end a male clutch member $r'$, similar in construction to the clutch member $l$ shown in Fig. 5. On the other end of said shaft $r$ is affixed a crank disk $r^2$, provided with a crank pin $r^3$. A connecting link $s$ connects the crank pin $r^3$ with the crank $k'$, and these parts are so positioned that reverse motion will be transmitted from the shaft $k$ to the shaft $r$. A crank shaft $t$, provided with two cranks $t'$ $t^2$, is journaled in the bearings $h$ $h'$, and this shaft has fixed on one end the female clutch member $t^3$, similar in construction and location to the clutch member $o$ shown in Fig. 5. Connecting links $t^4$ $t^5$ connect the cranks $n'$ $t'$ and $n^2$ $t^2$. A lateral rock-shaft $u$ is mounted in a bearing formed in the pedestal $g$, midway between the shafts $k$ and $r$, and has fixed on one end a double-armed clutch shifting member $u'$. On the other end of said rock-shaft $u$ is fixed an operating lever $u^2$. The clutch shifting member $u'$ has its opposite arms formed so as to engage the grooves of the clutch members $l$ and $r'$, and is so adjusted that when the operating lever $u^2$ is thrown forward in the position shown in Fig. 1, the clutch members $l$, $o$ will be thrown into engagement, and the members $r'$ $t^3$ will be disengaged. Direct motion will then be transmitted from the shaft $b$ to the shaft $c$ through the medium of the shafts $k$ and $n$. When the lever $u^2$ is in vertical alinement, both clutches will be disengaged, thereby allowing the engine to run idle, and when the lever $u^2$ is thrown to the rear the clutch members $r'$ $t'$ will be engaged, the clutch members $l$ and $o$ will be disengaged, and reverse motion will be transmitted from the engine shaft $b$ to the shaft $c$ through the medium of the reversing connecting link $s$ and the direct connecting links $t^4$ $t^5$.

If desired, the construction shown in Fig. 6 may be used. This construction includes a cross-head guide-way formed integrally with the pedestal $g$, a cross-head $v$ reciprocable therein, the latter being connected to the crank pin $r^3$ by a link $v'$ and to the crank $k'$ by a link $v^2$.

In Fig. 2 a pair of reversing gears $w$ $w'$ are substituted for the crank disk $r^2$ and the crank $k'$. Furthermore, the cranks at the rear ends of the mechanism are eliminated and direct motion is transmitted through the medium of a chain drive $x$, running over sprockets fixed on the respective shafts. It is obvious, of course, that any reverse motion device may be used at one end of the mechanism, and any direct motion device used at the other end. And the friction clutches and other parts may be of any type of construction best suited to the specific case in which the installation is to be made.

I claim:

1. In a reversing gear mechanism the combination of a driving shaft and a driven shaft, a divided shaft located between and having its ends connected with the adjacent ends of said driving and driven shafts, an auxiliary divided shaft located in parallelism with the first mentioned divided shaft, clutches adapted to engage the adjacent ends of the divided shaft members, a reversing connection between corresponding sections of the two divided shafts, a direct connection between the other sections of said divided shafts, and means for operating the friction clutches oppositely in synchronism.

2. In a reversing gear mechanism the combination of a driving shaft and a driven shaft, a divided shaft located between and having its ends connected with the adjacent ends of said driving and driven shafts, an auxiliary divided shaft located in parallelism with the first mentioned divided shaft, clutches adapted to engage the adjacent ends of the divided shaft members, a reversing crank connection between corresponding sections of the two divided shafts, a direct connection between the other sections of said divided shafts, and means for operating the friction clutches oppositely in synchronism.

3. In a reversing gear mechanism the combination of a driving shaft and a driven shaft, a divided shaft located between and having its ends connected with the adjacent ends of said driving and driven shafts, an auxiliary divided shaft located in parallelism with the first mentioned divided shaft, clutches adapted to engage the adjacent ends of the divided shaft members, a reversing crank connection between corresponding sections of the two divided shafts, a direct crank connection between the other sections of said divided shafts, and means for operating the friction clutches oppositely in synchronism.

4. In a reversing gear mechanism the combination of a driving shaft and a driven shaft, a divided shaft located between and having its ends connected with the adjacent ends of said driving and driven shafts, an auxiliary divided shaft located in parallelism with the first mentioned divided shaft, clutches adapted to engage the adjacent ends of the divided shaft members, a reversing connection between corresponding sections of the two divided shafts, a direct crank connection between the other sections of said divided shafts, and means for operating the friction clutches oppositely in synchronism.

5. In a reversing gear mechanism the combination of a driving shaft and a driven shaft, a divided crank shaft located between and having its ends connected with the adjacent ends of said driving and driven shafts, an auxiliary divided crank shaft located in parallelism with the first mentioned divided shaft, friction clutches adapted to engage the adjacent ends of the divided shaft members, a reversing crank connection between corresponding sections of the two divided shafts, a direct crank connection between the other sections of said divided shafts, and means for operating the friction clutches oppositely in synchronism.

6. In a reversing gear mechanism the combination of a driving shaft and a driven shaft, a divided shaft located between and having its ends connected with the adjacent ends of said driving and driven shafts, an auxiliary divided shaft located in parallelism with the first mentioned divided shaft, friction clutches adapted to engage the adjacent ends of the divided shaft members, a reversing connection between corresponding sections of the two divided shafts, a direct connection between the other sections of said divided shafts, and means for operating the friction clutches oppositely in synchronism.

7. In a reversing gear mechanism the combination of a driving shaft and a driven shaft, a divided shaft located between and having its ends connected with the adjacent ends of said driving and driven shafts, cranks on the members of said divided shaft, an auxiliary divided shaft located in parallelism with the first mentioned divided shaft, cranks on the members of said auxiliary divided shaft, friction clutches adapted to engage the adjacent ends of the divided shaft members, a reversing crank connection between corresponding sections of the two divided shafts, a direct crank connection between the other sections of said divided shafts, and means for operating the friction clutches oppositely in synchronism.

RUDOLF E. HENRICI.